Oct. 22, 1968  W. G. WHITE  3,406,570
ELECTRIC ANEMOMETERS

Filed June 23, 1967  2 Sheets-Sheet 1

INVENTOR:
W. GORDON WHITE,
BY Robert T. Palmer
ATTORNEY

Oct. 22, 1968  W. G. WHITE  3,406,570
ELECTRIC ANEMOMETERS
Filed June 23, 1967  2 Sheets-Sheet 2
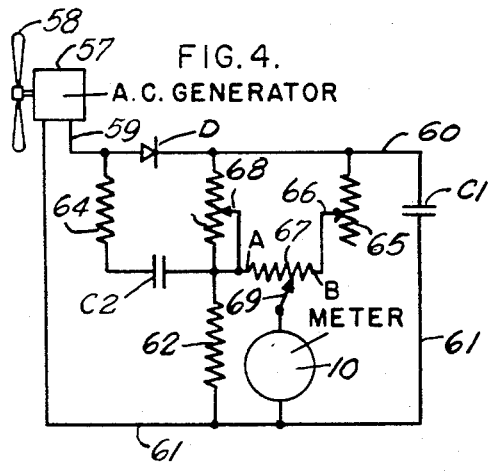
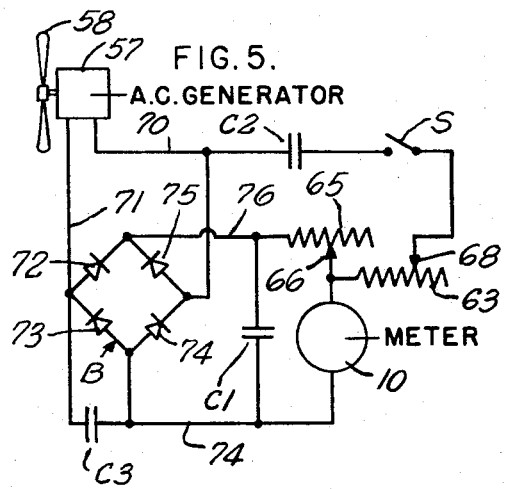
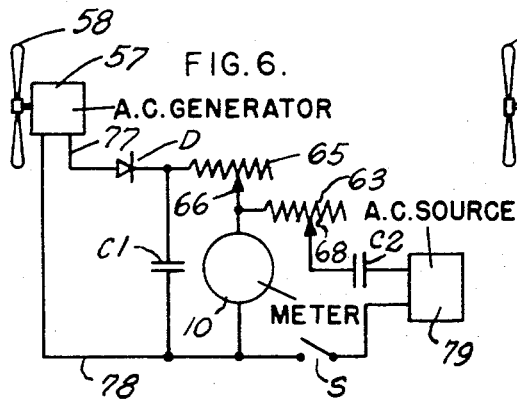
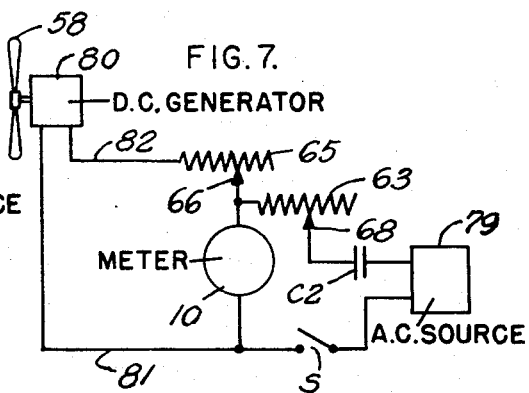
INVENTOR:
W. GORDON WHITE,
BY Robert J. Palmer
ATTORNEY

United States Patent Office

3,406,570
ELECTRIC ANEMOMETERS
Wilfrid Gordon White, Cricket Hill Drive,
Amherst, N.H. 03031
Filed June 23, 1967, Ser. No. 648,395
10 Claims. (Cl. 73—229)

ABSTRACT OF THE DISCLOSURE

A wind-driven generator is connected to a D'Arsonval, pivoted-coil type meter having a scale calibrated in terms of wind velocity. The meter has the usual pointer connected near one end to the coil, and having its other end opposite the scale, and is used to indicate current wind velocity. The meter has another pointer pivoted near one end, and having its other end opposite the scale. The two pointers are arranged to rotate in spaced-apart paths, and the tip of the maximum wind velocity indicator pointer is bent to extend across the path of rotation of the current wind velocity indicator pointer. The generator is so connected to the meter that when current wind velocity is to be indicated, DC which varies conformably with the wind velocity is applied to the meter. When maximum wind velocity is to be indicated, AC is superimposed on the DC, causing the current wind velocity indicator meter to oscillate about its current wind velocity position, and to strike hammer-like blows against the tip of the maximum wind velocity indicator pointer, driving the latter to a maximum wind velocity position. Reset means is provided for moving the maximum wind velocity indicator pointer towards the zero end of the scale.

Field of the invention

The field of the invention is anemometers in which wind-driven generators supply voltages or currents to voltmeters or ammeters respectively, having scales calibrated in terms of wind velocity. Such anemometers are widely used for indicating current wind velocities, and some include moving chart recorders.

An object of this invention is to provide an anemometer having one pointer for indicating current wind velocity, and having another pointer for indicating maximum wind velocity.

Summary of the invention

A wind-driven, AC generator is connected to a DC ammeter (though it could be a DC voltmeter) having a scale calibrated in terms of wind velocity. The ammeter has a first, DC current responsive pointer having one end or tip opposite the scale, and used to indicate current wind velocity. The ammeter has a second, maximum wind velocity indicator pointer having one end or tip opposite the scale. The two pointers are independently pivoted near their other ends, and are arranged to rotate in spaced-apart paths. The second pointer is bent at its tip to extend across the path of rotation of the tip of the first pointer.

When current wind velocity is to be indicated, AC from the generator is changed by a diode to half-wave DC which is filtered by a filter capacitor, and supplied to the ammeter, the filtered DC maintaining the first pointer, without objectionable fluctuations at the current wind velocity position.

When maximum wind velocity is to be indicated, unfiltered DC from the diode is supplied to the ammeter, and AC from the generator is superimposed on the unfiltered DC, causing the first pointer to oscillate about its current wind velocity position, and to strike hammer-like blows against the bent tip of the second pointer, driving the latter to a maximum wind velocity position, the friction of the pivot of the second pointer maintaining it at that position until it is reset.

A rotatable reset knob has an arm with an extension extending across the path of rotation of the second pointer, for moving the latter, when the reset knob is rotated, towards the zero end of the scale.

The AC superimposed on the DC when maximum wind velocity is to be indicated, could be from an AC source separate from the generator. The generator could be a DC generator, with a separate AC generator.

Brief description of the drawings

FIG. 4 is a circuit schematic of the preferred circuit of the invention;
FIG. 5 is a circuit schematic of another circuit embodying this invention;
FIG. 6 is a circuit schematic of another circuit embodying this invention,
and
FIG. 7 is a circuit schematic of another circuit embodying this invention.

Description of the preferred embodiment of the invention

Figure 1:
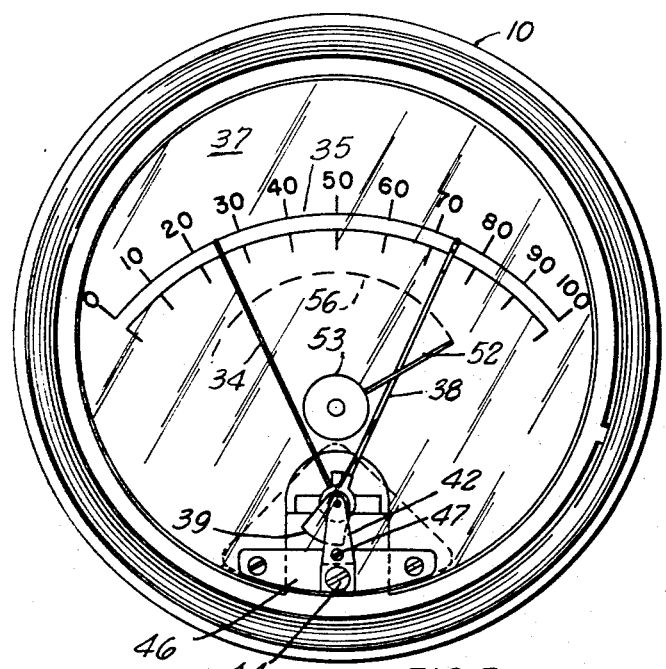
FIG. 1 is a front view of a meter embodying this invention.
Figure 2:
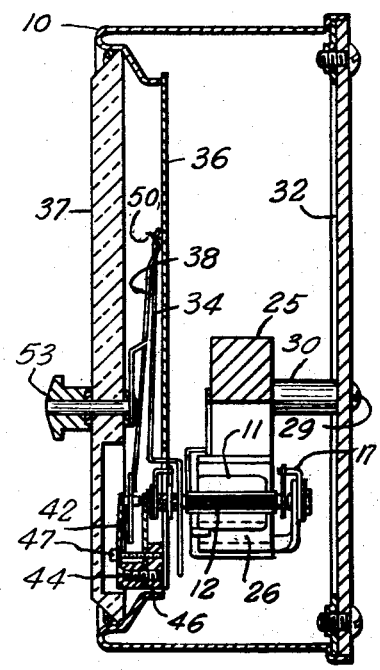
FIG. 2 is a side view, in section, of the meter.
Figure 3:
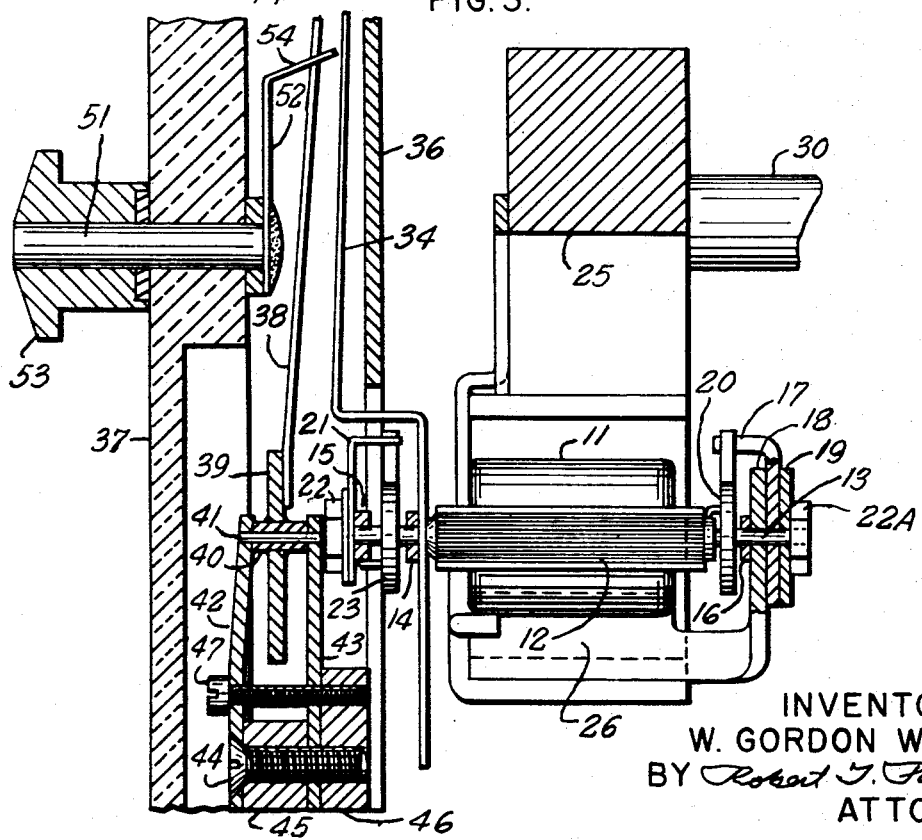
FIG. 3 is an enlarged view of the lower portion of FIG. 2.

Referring first to FIGS. 1–3, a meter 10 has the usual cylinder 11 around which extends the usual coil 12, the latter being attached to a shaft 13. The shaft 13 at its left end (facing FIGS. 2 and 3) extends through frame members 14 and 15, and is supported in the usual jewel bearing (not shown) within nut 22. The shaft 13 at its right end extends through frame members 16, 17, 18 and 19, and is supported in the usual jewel bearing (not shown) within nut 22A. The shaft 13 is attached near its right end to the inner end of the usual coiled return spring 20, the outer end of which is attached to the frame member 17, and is attached near its left end to the inner end of the usual coiled return spring 23, the outer end of which is attached to frame member 21. A permanent magnet 25 has legs 26, only one of which is shown, around the rotor 11. The magnet is attached by screws 29 and spacers 30 to removable back 32 of the meter.

A current wind velocity indicator pointer 34 is attached near its lower end to the shaft 13, and its upper end is opposite scale 35 on disc 36. The scale 35 is calibrated in terms of wind velocity (miles or knots per hour). The meter has a glass front 37.

The construction described so far in connection with FIGS. 1–3, except for the calibration of the scale 35, is that of a conventional ammeter. The coil 12 has the usual pair of wires (not shown) for connecting the meter 10 in an anemometer circuit. Current flowing through the coil 12 causes the rotor 11 to rotate, and to rotate through the shaft 13, the pointer 34.

This invention adds to a conventional meter 10, a maximum wind velocity indicator pointer 38 attached near its lower end to counterweight 39 which is attached to sleeve 40, which, in turn, is attached to shaft 41 journalled for rotation in the upper portions of straps 42 and 43, the lower portions of which are spaced apart by spacer 45, and are attached by screw 44 to frame member 46. A screw 47 extends through the straps 42 and 43, and is threaded into the frame member 46. By tightening the screw 47, friction between the straps 42 and 43 and the ends of the sleeve 40 is increased, thereby increasing the friction of the suspension of the pointer 38. The latter has an upper portion which extends across the path of rotation of the upper portion of the pointer 34.

Journalled for rotation in the glass front 36 is a shaft 51 having a lever 52 on one end, and having attached to its other end a knob 53. The outer end of the lever 52 is turned inwardly at 54 across the path of rotation of the corresponding portion of the pointer 38 between the latter and the maximum wind velocity end of the scale 35. The tip of the lever 52, when the knob 53 is rotated, rotates in an arc 56.

The pointers 34 and 38 are seen to be independently supported, with their shafts 13 and 41 respectively, spaced apart.

Referring now to FIG. 4, an AC generator 57 is wind driven by blades 58. The generator 57 is connected by wire 59 to diode D which is connected by wire 60 to capacitor CL which is connected by wire 61 to the generator 57. A resistor 62 is connected to the wire 61, and in series with variable resistor 63 to the wire 60. A resistor 64 is connected to the wire 59, and in series with capacitor C2 to the junction of the resistors 62 and 63. A variable resistor 65 is connected to the wire 60, and has a slider 66 connected to one end of potentiometer 67, the other end of which is connected to the junction of the resistors 62 and 63, and to slider 68 of the resistor 63. The meter 10 is connected to slider 69 of the potentiometer 67, and to the wire 61. The left end of the potentiometer 67, the end connected to the junction of the resistors 62 and 63, is marked "A". The right end of the potentiometer 67, the end connected to the slider 66 of the resistor 65, is marked "B".

*Operation of FIGS. 1–4*

AC from the generator 57 is rectified by the diode D, and changed to half-wave DC. AC from the generator 57 is supplied through the wire 59, the resistor 64 and the capacitor C2, and through the wire 61 across the resistor 62.

When current wind velocity is to be indicated, the slider 69 of the potentiometer 67 is moved to position B, placing all of the resistance of the potentiometer in series with the resistor 62 across the meter 10 so that the AC across the meter 10 is insignificant. At the same time, all of the resistance of the potentiometer is removed from the series connection of the meter 10 and the resistor 65 across the capacitor C1 so that the latter effectively filters the half-wave DC supplied from the diode D. The pointer 34 indicates the current wind velocity without objectionable fluctuations.

When maximum wind velocity is to be indicated, the slider 69 of the potentiometer 67 is moved to the position A, placing all of the resistance of the potentiometer in series with the resistor 65 and the meter 10 across the capacitor C1, causing the filtering action of the latter to be insignificant. At the same time, all of the resistance of the potentiometer in series with the meter 10 across the resistor 62 is removed, causing the AC across the resistor 62 to be applied across the meter, superimposed on the half-wave DC in phase with the latter. This causes the pointer 34 to oscillate about the current wind velocity position, and to strike hammer-like blows against the end portion 50 of the pointer 38, driving the latter to the maximum wind velocity position. The pointer 38 due to the friction of its suspension remains in the maximum wind velocity position until it is reset.

By rotation of the knob 53 in a counterclockwise direction, the lever 52 is rotated so that its end portion 54 contacts the pointer 38 and moves the latter towards the zero end of the scale 35 so that, when desired, another maximum wind velocity can be indicated.

The resistance of the resistor 65 can be varied when the slider 69 of the potentiometer 67 is at the position B, to cause the pointer 34 to indicate the current wind velocity. The resistance of the resistor 63 can be varied when the slider 69 of the potentiometer is at the position A, to cause the pointer 34 to oscillate about an average position which is the current wind velocity position.

*Description of FIG. 5*

Those components of FIG. 5 and the following figures which correspond to those of FIG. 4, are given the same reference characters. AC generator 57 is driven by blades 58. The generator 57 is connected by wire 70 to the junction of diodes 74 and 75, and by wire 71 to the junction of diodes 72 and 73 in a conventional rectifier bridge B. The wire 70 is connected through capacitor C2 and switch S to slider 68 of resistor 63. The resistor 63 is connected by wire 76 to the junction of the diodes 72 and 75. Meter 10 is connected to the slider 66 of the resistor 65, and the wire 74 which is connected to the junction of the diodes 73 and 74, and through capacitor C3 to the wire 71.

When current wind velocity is to be indicated, the switch S is opened. Full-wave DC is supplied from the bridge B, is filtered by the capacitor C1, and is supplied across the meter 10, causing its pointer 34 to indicate current wind velocity.

When maximum wind velocity is to be indicated, the switch S is closed, causing AC from the generator 57 to be supplied through the wire 70, the capacitor C2, the switch S and the resistor 63 to one side of the meter 10, and through the wire 71, the capacitor C3, and the wire 74 to the other side of the meter 10, and superimposed on the DC, causing the pointer 34 to oscillate about the current wind velocity position, and the strike hammer-like blows against the end portion 50 of the pointer 38, driving the latter to the maximum wind velocity position.

*Description of FIG. 6*

An AC generator 57, wind driven by blades 58, is connected by wire 77 to diode D which is connected to variable resistor 65. The generator 57 is connected by wire 78 to meter 10 which is connected to slider 66 of the resistor 65. Capacitor C1 is connected across the series connection of the meter 10 and the resistor 65. The slider 66 of the resistor 65 is connected to variable resistor 63, slider 68 of which is connected through capacitor C2 to AC source 79 which is connected through switch S to the wire 78.

When current wind velocity is to be indicated, the switch S is opened. Half-wave DC from the diode D, filtered by the capacitor C1, is supplied through the resistor 63 and the wire 78 across the meter 10, causing its pointer 34 to indicate current wind velocity.

When maximum wind velocity is to be indicated, the switch S is closed, supplying AC from the source 79 through the switch S, the capacitor C2, and the resistor 63 across the meter 10, superimposed on the filtered half-wave DC, causing the pointer 34 to oscillate about the current wind vlocity position, and to strike hammer-like blows against the end portion 50 of the pointer 38, driving the latter to the maximum wind velocity position.

*Description of FIG. 7*

A DC generator 80 is wind driven by blades 58. The generator 80 is connected by wire 81 to the meter 10 which is connected by slider 66 of variable resistor 65, and the latter to wire 82 which is connected to the generator 80. AC source 79 is connected through capacitor C2 to slider 68 of variable resistor 63 which is connected through the resistor 65, and its slider 66 to the wire 82. The source 79 is connected through switch S to the meter 10 and the wire 81.

When current wind velocity is to be indicated, the switch S is opened. DC from the generator 80 is supplied through the wires 81 and 82, and the resistor 65 across the meter 10, causing its pointer 34 to indicate current wind velocity.

When maximum wind velocity is to be indicated, the switch S is closed, supplying AC from the source 79 through the switch S, the capacitor C2, and the resistor 63 across the meter 10, superimposed onto the DC from the generator 80, causing the pointer 34 to oscillate about the current wind velocity position, and to strike hammer-like blows against the end portion 50 of the pointer 38, driving the latter to the maximum wind velocity position.

The AC generators 79 of FIGS. 6 and 7 could be conventional 60 cycle sources, or could be sine wave or square wave generators.

The circuits of FIGS. 4-7 are merely illustrative of some circuits than can be used. The circuit of FIG. 4 is preferred for the reason that it is the simplest and least expensive.

I claim:

1. An anemometer comprising a wind-driven, electric generator, a DC meter having a pivoted coil, and having a scale calibrated in terms of wind velocity, said meter having a first, current wind velocity, indicator pointer attached near one end to said coil, and having its other end opposite said scale, said meter having a second, maximum wind velocity, indicator pointer having one end opposite said scale, means pivoting said second pointer near its other end independently of the pivot of said coil, said pointers being arranged to rotate in spaced-apart paths, one of said pointers having a portion extending across the path of rotation of the other one of said pointers, means including said generator, when current wind velocity is to be indicated, for supplying DC which varies conformably with wind velocity to said meter, and means, when maximum wind velocity is to be indicated, for superimposing AC on said DC, and when current wind velocity is to be indicated, for removing said AC from said DC.

2. An anemometer as claimed in claim 1 in which there is provided reset means for moving said second pointer towards the zero end of said scale.

3. An anemometer comprising a wind-driven AC generator, a DC meter having a pivoted coil, and having a scale calibrated in terms of wind velocity, said meter having a first, current wind velocity, indicator pointer attached near one end to said coil, and having its other end opposite said scale, said meter having a second, maximum wind velocity, indicator pointer having one end opposite said scale, means pivoting said second pointer near its other end independently of the pivot of said coil, said pointers being arranged for rotation in spaced-apart paths, one of said pointers having a portion extending across the path of rotation of the corresponding portion of the other one of said pointers, means, when current wind velocity is to be indicated, for changing AC from said generator to DC, and supplying said DC to said meter, and means, when maximum wind velocity is to be indicated, for superimposing AC from said generator onto said DC, and when current wind velocity is to be indicated, for removing said AC from said DC.

4. An anemometer as claimed in claim 3 in which reset means is provided for moving said second pointer towards the zero end of said scale.

5. An anemometer comprising a wind-driven, AC generator, a DC meter having a pivoted coil, and having a scale calibrated in terms of wind velocity, said meter having a first, current wind velocity indicator pointer attached near one end to said coil and having its other end opposite said scale, said meter having a second, maximum wind velocity indicator pointer having one end opposite said scale, means for pivoting said second pointer near its other end independently of the pivot of said coil, said pointers being arranged to rotate in spaced-apart paths, one of said pointers having a portion extending across the path of rotation of the corresponding portion of the other one of said pointers, means, when current wind velocity is to be indicated, for changing AC from said generator to half-wave DC and supplying said DC to said meter, and means when maximum wind velocity is to be indicated, for superimposing AC from said generator onto said DC.

6. An anemometer as claimed in claim 5 in which reset means is provided for moving said second pointer towards the zero end of said scale.

7. An anemometer comprising a wind-driven, AC generator, a DC meter having a pivoted coil, and having a scale calibrated in terms of wind velocity, said meter having a first, current wind velocity indicator pointer attached near one end to said coil, and having its other end opposite said scale, said meter having a second, maximum wind velocity indicator pointer having one end opposite said scale, means for pivoting said second pointer near its other end near its other end independently of the pivot of said coil, said pointers being arranged for rotation in spaced-apart paths, one of said pointers having a portion extending across the path of rotation of the corresponding portion of the other one of said pointers, a pair of AC supply wires connected to said generator, a diode having its cathode connected to one of said wires, a capacitor connected to the other one of said wires, a third wire connecting said capacitor to the anode of said diode, one end of said meter being connected to said other one of said wires, first and second resistors connected in series to said third wire and to said other one of said wires, a third resistor and a second capacitor connected in series to said one wire and to the junction of said first and second resistors, a fourth resistor connected at one end to said third wire, and a potentiometer connected at one end to said junction and at its other end to the other end of said fourth resistor, said potentiometer having a slider connected to the other end of said meter.

8. An anemometer as claimed in claim 7 in which reset means is provided for moving said second pointer towards the zero end of said scale.

9. An anemometer comprising a wind-driven DC generator, a DC meter having a pivoted coil, and having a scale calibrated in terms of wind velocity, said meter having a first, current wind velocity indicator pointer attached near one end to said coil, and having its other end opposite said scale, said meter having a second, maximum wind velocity indicator pointer having one end opposite said scale, means for pivoting said second pointer near its other end independently of the pivot of said coil, said pointers being arranged to rotate in spaced-apart paths, one of said pointers having a portion extending across the path of rotation of the corresponding portion of the other one of said pointers, means, when current wind velocity is to be indicated, for supplying DC from said generator to said meter, an AC supply source, and means, when maximum wind velocity is to be indicated, for superimposing AC from said source onto said DC from said generator, and when current wind velocity is to be indicated, for removing said AC from said DC.

10. An anemometer as claimed in claim 9 in which reset means is provided for moving said second pointer towards the zero end of said scale.

References Cited

UNITED STATES PATENTS

| | | | |
|---|---|---|---|
| 1,570,289 | 1/1926 | Thomas | 73—189 X |
| 2,110,391 | 3/1938 | Davis. | |
| 2,375,227 | 5/1945 | Hillman | 73—189 |
| 2,914,712 | 11/1959 | Chamberlain | 324—103 X |
| 2,923,861 | 2/1960 | Colt | 73—189 X |
| 3,088,321 | 5/1963 | Lathrop | 73—379 |

JERRY W. MYRACLE, *Primary Examiner.*

RICHARD C. QUIESSER, *Assistant Examiner.*